US012794730B2

(12) United States Patent
Mujumdar et al.

(10) Patent No.: US 12,794,730 B2
(45) Date of Patent: Nov. 10, 2026

(54) AUTOMATIC DISCOVERY AND CONFIGURATION OF IOT DEVICES

(71) Applicant: Telefonaktiebolaget LM Ericsson (publ), Stockholm (SE)

(72) Inventors: Anusha Pradeep Mujumdar, Bangalore (IN); Venkatesh U, Chennai (IN); Senthamiz Selvi Arumugam, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 756 days.

(21) Appl. No.: 17/603,705

(22) PCT Filed: Apr. 25, 2019

(86) PCT No.: PCT/IN2019/050332
§ 371 (c)(1),
(2) Date: Oct. 14, 2021

(87) PCT Pub. No.: WO2020/217246
PCT Pub. Date: Oct. 29, 2020

(65) Prior Publication Data
US 2022/0200817 A1 Jun. 23, 2022

(51) Int. Cl.
*H04L 12/28* (2006.01)
*G16Y 40/35* (2020.01)
(Continued)

(52) U.S. Cl.
CPC .......... *H04L 12/282* (2013.01); *H04L 67/125* (2013.01); *H04L 67/306* (2013.01); *G16Y 40/35* (2020.01)

(58) Field of Classification Search
CPC ... H04L 12/282; H04L 67/125; H04L 67/306; H04L 12/2809; H04L 12/2829; G16Y 40/35; G06F 8/61
See application file for complete search history.

(56) References Cited

U.S. PATENT DOCUMENTS 9,451,443 B1 * 9/2016 Martell ................. H04W 88/02
9,817,383 B1 * 11/2017 Sinha ..................... G05B 15/02
(Continued)

OTHER PUBLICATIONS

International Search Report and the Written Opinion of the International Searching Authority, issued in corresponding International Application No. PCT/IN2019/050332, dated Aug. 20, 2019, 11 pages.
(Continued)

*Primary Examiner* — Rufus C Point
(74) *Attorney, Agent, or Firm* — ROTHWELL, FIGG, ERNST & MANBECK, P.C.

(57) ABSTRACT

A method for configuring devices for a user is provided. The method includes creating a device-set profile for the user. The device-set profile includes a first set of configuration parameters for a first set of devices at a first location. The device-set profile further includes usage characteristics information and device interactions information for devices in the first set of devices. The method further includes retrieving the device-set profile for the user; discovering a second set of devices at a second location; and automatically configuring the second set of devices based on the device-set profile for the user.

21 Claims, 8 Drawing Sheets

(51) Int. Cl.
*H04L 67/125* (2022.01)
*H04L 67/306* (2022.01)

(56) References Cited

U.S. PATENT DOCUMENTS

| | | | | |
|---|---|---|---|---|
| 9,900,171 | B2 | 2/2018 | Guedalia et al. | |
| 9,984,686 | B1 * | 5/2018 | Mutagi | G10L 17/22 |
| 10,205,988 | B1 * | 2/2019 | Waterman | H04N 21/8455 |
| 10,270,881 | B2 | 4/2019 | George et al. | |
| 10,547,469 | B2 * | 1/2020 | Balasubramanian | H04W 4/80 |
| 11,018,887 | B2 * | 5/2021 | Balasubramanian | H04L 12/2807 |
| 2006/0123081 | A1 * | 6/2006 | Baudino | G06Q 30/02 709/204 |
| 2013/0331087 | A1 * | 12/2013 | Shoemaker | H04L 12/2818 455/420 |
| 2014/0244834 | A1 * | 8/2014 | Guedalia | H04W 4/08 709/224 |
| 2015/0019342 | A1 | 1/2015 | Gupta | |
| 2016/0226732 | A1 * | 8/2016 | Kim | H04W 4/70 |
| 2016/0308987 | A1 | 10/2016 | Kan et al. | |
| 2017/0054615 | A1 * | 2/2017 | Wilson | H04L 43/0817 |
| 2017/0191695 | A1 * | 7/2017 | Bruhn | H04N 21/4131 |
| 2017/0220940 | A1 | 8/2017 | Shaashua et al. | |
| 2017/0295447 | A1 * | 10/2017 | Tegegne | H04W 4/50 |
| 2018/0032590 | A1 * | 2/2018 | Recavarren | H04L 67/306 |
| 2018/0034656 | A1 * | 2/2018 | Balasubramanian | H04W 4/70 |
| 2018/0053094 | A1 * | 2/2018 | Patel | G06N 5/02 |
| 2018/0137858 | A1 * | 5/2018 | Saxena | H04L 12/2816 |
| 2018/0205602 | A1 * | 7/2018 | Roman | H04L 41/0846 |
| 2019/0102947 | A1 * | 4/2019 | Lee | G06T 19/006 |
| 2020/0244297 | A1 * | 7/2020 | Zalewski | H04L 67/10 |
| 2020/0267217 | A1 * | 8/2020 | Defiebre | H04L 69/24 |

OTHER PUBLICATIONS

Chae et al. "Personal Smart Space : IoT based User recognition and Device control" 2016 IEEE Tenth International Conference on Semantic Computing, pp. 181-182.

Wang et al."Hybrid Ontology Matching for Solving the Heterogeneous Problem of the IoT" 2012 IEEE 11th International Conference on Trust, Security and Privacy in Computing and Communications, pp. 1799-1804.

Cobot—Wikipedia, printed from https://en.wikipedia.org/wiki/Cobot on Aug. 23, 2021, 3 pages.

* cited by examiner

Device Interactions

| | D1 | D2 | D3 | D4 | D5 | D6 | D7 | D8 | ... |
|---|---|---|---|---|---|---|---|---|---|
| D1 | 5 | | 6 | | | | | | |
| D2 | | 3 | | | | | | | |
| D3 | | | | 3 | | | | | |
| D4 | | | 1 | | | | | | |
| D5 | | | | | | | | 2 | |
| D6 | | 2 | | | 5 | | | | |
| D7 | | | | 3 | | 9 | | 11 | |

AUTOMATIC DISCOVERY AND CONFIGURATION OF IOT DEVICES

CROSS REFERENCE TO RELATED APPLICATION(S)

This application is a 35 U.S.C. § 371 National Phase Entry Application from PCT/IN2019/050332, filed Apr. 25, 2019, designating the United States, the disclosure of which is incorporated herein by reference in its entirety.

TECHNICAL FIELD

Disclosed are embodiments related to automatic discovery and configuration of Internet-of-Thing (IoT) type devices.

BACKGROUND

It is expected that as many as 50 billion IoT-type devices will be connected by 2020, and that individual users may use multiple connected devices on a daily basis. Such devices range from smartphones and smart TVs to household appliances all of which are expected to be interoperable. Managing connectivity to these devices will be a significant part of network management in the future.

With a large number of IoT-type devices existing on every network, two serious challenges arise: discovery and configuration. Not all devices are easy to configure and ready to seamlessly work with other devices. There exists a need for a capability that automatically discovers all the relevant devices in a given environment (e.g. a user's home or work environment) and automatically connects with them and enables their capabilities based on the user's needs.

SUMMARY

Some prior work has considered setting device configurations for TVs or lighting after recognizing through visual sensors which user is in a room. That is, a specific user (e.g., Person 1 or Person 2) is recognized, and then user-specific settings are applied. However, such work has been limited to pre-configured spaces, typically a home environment. There remains a need for addressing the challenging problems of discovering and configuring new, previously unknown or unused devices in new environments or new contexts, including those in which a user has never before visited. Embodiments address these and other problems. For example, a user may have a smart aura associated with the user, which may be portable and continuously or periodically updated, e.g. as settings are changed, new devices are added, or additional usage characteristics are collected.

As used herein, a smart aura (alternatively referred to as a device-set profile) includes a set of devices and their corresponding configurations and interconnections. A smart aura may be specific to a user, such as a human or a device. By using such a smart aura, embodiments allow discovery of the most relevant devices to connect to, and the best initial configurations for the devices (e.g. to ensure that a device's role within the smart aura is maintained). Such discovery and configuration may be based on the constituent devices within that smart aura and their corresponding configurations. Devices may be organized hierarchically (e.g. one class of devices might include coffee makers, with subclasses related to different brands or models of coffee makers), by capability or function, or in some other manner.

In some embodiments, a hierarchical organization could be too rigid in certain circumstances. By modeling the interconnections between devices, including the capabilities of the devices and their affect (individually or in aggregate) on the environment, the smart aura may enable additional ways of organizing devices. For instance, a smart window shutter and a heating unit may both be determined to have an impact on the temperature of the environment (in the case of the window shutter, the impact may depend on outside conditions), but the shutter and heating unit would typically be classified as different types of devices in a hierarchical organization. Likewise, a smart window shutter and a lamp may both be determined to have an impact on the lighting level of the environment (in the case of the window shutter, the impact may depend on outside conditions), but would typically be classified as different types of devices in a hierarchical organization.

In embodiments, the smart aura may be associated with a user's primary identification device (such as a smartphone, smartwatch or other network-connected identifying device). The primary identification device may also be embedded inside the human body, or embedded in the device. In embodiments, the smart aura periodically discovers devices that are most similar to those within it, and may pair with such devices (e.g. may cause the primary identification device or any other device in the smart aura to pair with such devices).

In embodiments, devices in a new environment may automatically be configured based on the smart aura of a user in the new environment. The configurations are based on the user's preferences, and the smart aura may be updated e.g. each time the user adds a new device or changes settings of an existing device. Devices may be automatically configured by intelligently translating configurations present in the smart aura and also taking into account the new environment, including the ambience or other characteristics of the environment (e.g., to achieve a particular lighting luminosity level, a number of light bulbs or their settings may need to vary depending on the size of the room, the amount of natural light available, and so forth). The automatic configuration may also take into account other factors, such as seasonality and time of day (e.g. air conditioners or heaters are seasonal, lighting and TV may be more used in the evenings for a given user, while for the same user a coffee maker may be more used frequently in the mornings).

Advantages of embodiments described herein include the simplification of the discovery and configuration of IoT-type devices. This simplification is especially pronounced when in a new environment and confronted with a large number of new devices, but can also be helpful when a new device is added to an old environment, or for a smaller number of new devices in a new environment. In embodiments, the automatic discovery and configuration is done intelligently in such a way as to take into account a user's preferences (whether express or inferred through various configurations that have been collected by the smart aura). In embodiments, the smart aura can work across tasks in the same geography, or can work across geographies. In embodiments, a global model is maintained (e.g., in a smart aura knowledge base), which is based on individual local models, and can therefore provide insights from other environments or users. This global model may be used in some embodiments to configure devices in a completely new (and perhaps unfamiliar) environment, which allows the system to scale to large numbers of devices.

According to a first aspect, a method for configuring devices for a user is provided. The method includes creating a device-set profile for the user. The device-set profile includes a first set of configuration parameters for a first set of devices at a first location. The device-set profile further includes usage characteristics information and device interactions information for devices in the first set of devices. The method further includes retrieving the device-set profile for the user; discovering a second set of devices at a second location; and automatically configuring the second set of devices based on the device-set profile for the user.

In some embodiments, the user may include a human, and in other embodiments, the user may include a robot. In some embodiments, discovering the second set of devices at the second location comprises: determining the user is at the second location for a period of time greater than a threshold, wherein the second location is different from the first location; and determining which devices at the second location are relevant to the user based on the device-set profile. In some embodiments, automatically configuring the second set of devices based on the device-set profile for the user comprises: determining a goal specification for the second set of devices based on the device-set profile; searching a search space comprising combinations of configurations for the second set of devices; and as a result of searching, determining configurations for the second set of devices based on the goal specification. In some embodiments, determining configurations for the second set of devices based on the goal specification comprising minimizing a cost function, wherein the cost function is based on the goal specification.

In some embodiments, automatically configuring the second set of devices based on the device-set profile for the user comprises: determining a correspondence between a first device in the first set of devices and a second device in the second set of devices; determining a first configuration from the device-set profile corresponding to the first device; and translating the first configuration into a second configuration for the second device, wherein the second configuration is compatible with the second device. In some embodiments, the method further includes updating the device-set profile for the user, wherein updating the device-set profile for the user comprises adding additional configuration parameters for one or more devices.

In some embodiments, the method further includes detecting a new device at the first location and wherein updating the device-set profile for the user is performed in response to detecting the new device at the first location. In some embodiments, the method further includes detecting a second set of devices at a second location; and receiving a second set of configuration parameters for the second set of devices at the second location. Updating the device-set profile for the user is performed in response to receiving the second set of configuration parameters. In some embodiments, creating the device-set profile for the user comprises receiving a master device-set profile from a database. In some embodiments, the master device-set profile is based on input received from multiple users.

In some embodiments, the method further includes updating the master device-set profile for a given time instant; creating a profile difference between the device-set profile for the user and the master device-set profile; and sending the profile difference to the database. In some embodiments, the method further includes updating the master device-set profile for a given time instant; creating a profile difference between the device-set profile for the user and the master device-set profile; and updating the device-set profile based on the profile difference.

According to a second aspect, a node adapted for configuring devices for a user is provided. The node includes a data storage system; and a data processing apparatus comprising a processor, wherein the data processing apparatus is coupled to the data storage system. The data processing apparatus is configured to create a device-set profile for the user. The device-set profile includes a first set of configuration parameters for a first set of devices at a first location. The device-set profile further includes usage characteristics information and device interactions information for devices in the first set of devices. The data processing apparatus is further configured to retrieve the device-set profile for the user; discover a second set of devices at a second location; and automatically configure the second set of devices based on the device-set profile for the user.

According to a third aspect, a node is provided. The nodes includes a creating unit configured to create a device-set profile for the user, wherein the device-set profile includes a first set of configuration parameters for a first set of devices at a first location and wherein the device-set profile further includes usage characteristics information and device interactions information for devices in the first set of devices. The node further includes a retrieving unit configured to retrieve the device-set profile for the user. The node further includes a discovering unit configured to discover a second set of devices at a second location. The node further includes a configuring unit configured to automatically configure the second set of devices based on the device-set profile for the user.

According to a fourth aspect, a computer program comprising instructions which when executed by processing circuitry of a node causes the node to perform the method of any one of the embodiments of the first aspect.

According to a fifth aspect, a carrier containing the computer program of the fourth aspect is provided. The carrier is one of an electronic signal, an optical signal, a radio signal, and a computer readable storage medium.

BRIEF DESCRIPTION OF THE DRAWINGS

The accompanying drawings, which are incorporated herein and form part of the specification, illustrate various embodiments.

DETAILED DESCRIPTION

Figure 1:
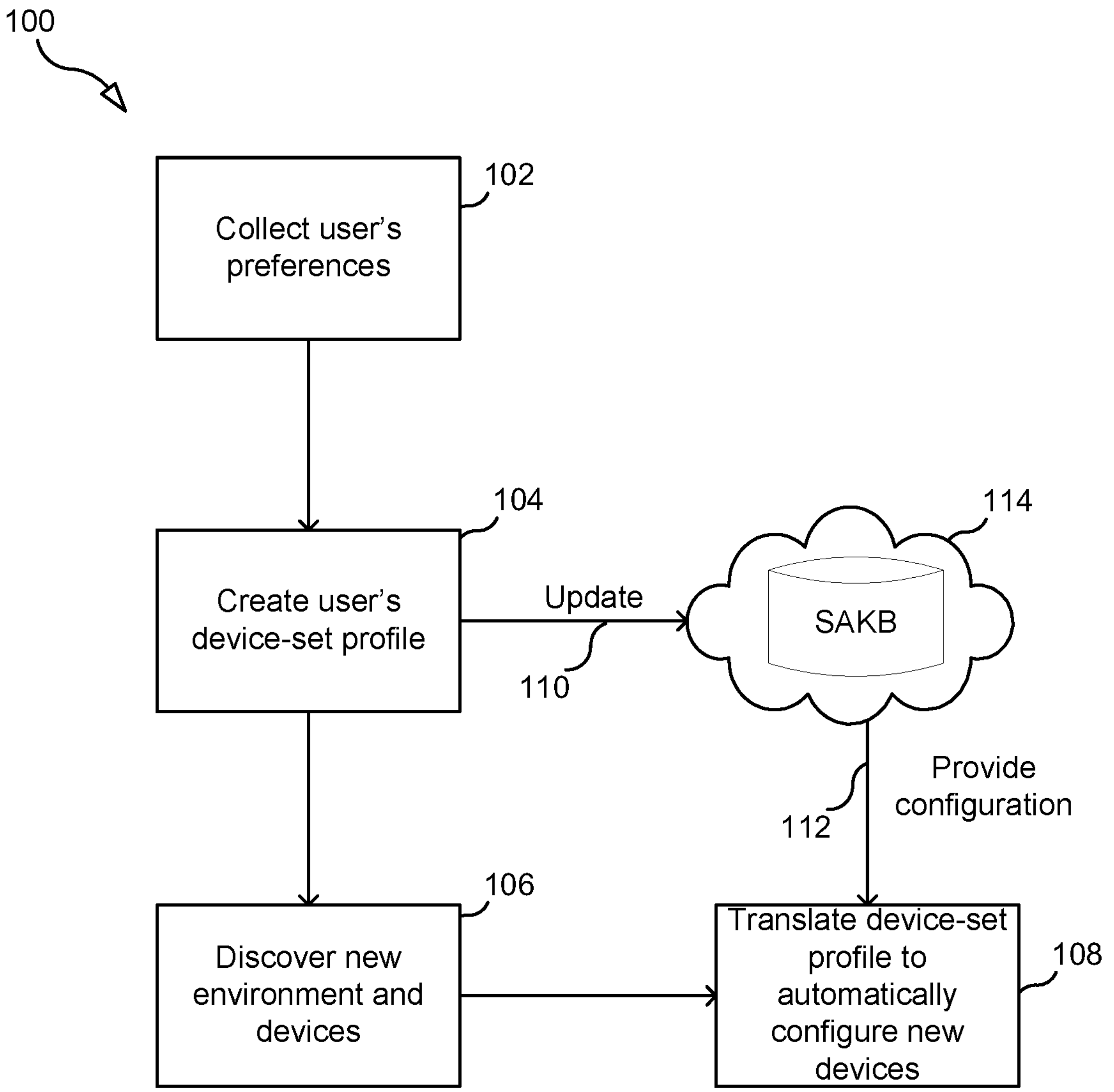
FIG. 1 shows a flow chart according to an embodiment.

FIG. 1 illustrates a process according to an embodiment. As shown, process 100 includes collecting configuration parameters (step 102), creating a device-set profile (104), discovering a new environment and devices (step 106), and translating the device-set profile to auto-configure the new devices (step 108). These steps can be facilitated, in part, by a database, such as knowledge base 114. For example, when the device-set profile is created, knowledge base 114 may be updated with that information (step 110). In embodiments, knowledge base 114 may be periodically or continuously updated, as the device-set profile may not be static but can instead change e.g. according to new configurations or devices being added to it. Likewise, when translating the device-set profile to auto-configure the new devices, knowledge base 114 may provide configurations (step 112). That is, knowledge base 114 may be used to provide configurations, such as giving hints or explicit instructions regarding translating a configuration for one device into a configuration for a corresponding device (e.g. between different brands of a coffee machine). Knowledge base 114 may be continually updated with configuration information, e.g. to account for new models or updates to existing models regarding configuration information. Knowledge base 114 (like other components described herein, including those components shown in FIG. 2) may be implemented in a variety of ways, including as a single server, as multiple servers, as part of a virtual server co-located with other components described herein, or it may be separated geographically from such other components.

The device-set profile may also be referred to as a "smart aura," and the terms are used interchangeably herein. For example, knowledge base 114 is labeled as a "smart aura knowledge base" (SAKB) in FIG. 1. The smart aura (or device-set profile) may be created for a human or for a device. Examples of how each such smart aura may be used are described below.

Human Smart Aura

A human user may be interested in a smart aura for many reasons. For example, the user may reside in a smart home that has several IoT-type devices. Such devices may include a coffee machine, lighting, a printer, an air purifier, an air conditioner, a heater, a fragrance diffuser, a TV, and so on. The user (for purposes of this example, "Bob") uses these devices in his home, and they are configured in a particular way according to Bob's preferences. The set of devices, and the specific configurations for them that Bob has set up, form his smart aura. Said another way, the smart aura (or device-set profile) includes the set of devices and their corresponding configurations.

When Bob moves to a new space, e.g., a hotel room in a new city, his smart aura is transported with him. This enables an auto discovery of devices in the new space that are most similar to ones existing in his aura. For example, in some embodiments, the smart aura may give a lower ranking to devices that are not relevant for Bob's smart aura. By way of example, a relevancy determination may take into consideration one or more of the devices and configurations present in the smart aura, context information (e.g. to determine seasonally irrelevant devices such as heater in the summer), and configuration information provided by the user. In embodiments, the smart aura may also include a threshold, such that instead of pairing with every available device, it instead auto-discovers and pairs with highly ranked devices. This allows the user, for instance, to recreate the capability space (as defined by the smart aura) that he is familiar with in his home environment. Thus, in this example, the coffee machine that is closest in performance to Bob's coffee machine at home is discovered and auto-configured to match his settings at home (such as a ratio of coffee, sugar, water, and milk). Likewise, the TV in the new environment may be matched to Bob's TV configuration, e.g. with his channel preferences, brightness and contrast configuration, and so on.

The auto-configuration of devices may be carried out, in some embodiments, by using capability matching. For example, Bob may prefer volume 12 for his TV at home. This may correspond to volume 40 in the hotel based on the change in the model of the TV and depending on the room characteristics like shape, size, and Bob's distance from the TV. Therefore, based on the decibel preferences of the user, the TV (or TV remote) may be configured to provide the optimal experience.

Bob may also have one or more devices that he carries with him, such as a smart watch or smart phone. In embodiments, such devices may be used to carry the smart aura and to detect a new environment; they may also facilitate the automatic discovery and configuration of new devices. For purposes of this discussion, such devices (e.g. that are carried with the user and that may facilitate the automatic discovery and configuration of new devices) are referred to as primary identifying devices. For instance, Bob's smartwatch may be a primary identifying device. This primary identifying device may be able to detect that Bob is in a new location, and has been in the new location for a certain amount of time (e.g. more than 30 minutes). In some embodiments, the primary identifying device may also be able to correlate location information with other information, such as hotel reservation information or other scheduling information, to detect that Bob is in a new location. The primary identifying device may also be able to communicate with other components, including the knowledge base 114 described above and other components described later. The primary identifying device may also contain an application that permits it to perform some or all of the automatic discovery and configuration logic described herein.

A smart aura may also have one or more contexts associated with it. For example, a user may have one set of configurations for daytime and a different set for nighttime. Likewise, a user may have one set of configurations when at home or work, or when at a hotel for personal reasons or for work. In embodiments, the smart aura is able to detect such context-specific configurations, and may also receive input from the user regarding such preferences. In embodiments, a context may be detected automatically (e.g. based on time of day, scheduling information, changes made to a configuration, and so on), or may be input by a user. As another example, a set of configurations may depend on location, time or date information, presence of other smart auras in the area (e.g. from a user's colleagues or family members), and so on.

Device Smart Aura

A device (e.g. a robot in a factory) may also be interested in a smart aura for many reasons. For example, the device may have certain tasks that it typically performs, but may also need to be repurposed to perform other tasks.

The largest inefficiency that most manufacturers face is inflexibility. Traditional industrial automation requires hundreds of hours to reprogram, making it very impractical to change how a given task is performed. This main challenge can be solved by using advanced machine learning techniques, which can enable devices (such as robots) to learn new tasks far more quickly than with conventional programming. Another technique can involve sharing what a given device has learned with each other devices through so-called "distributed learning." Foxbot is an example of a robot that can perform more than 20 manufacturing tasks, including pressing, printing, polishing, packaging, and testing.

In this example, a robot in a factory may include a smart aura that includes a set of job objectives or goals. It may also include a number of configuration parameters to achieve those goals. One robot may be able to share this smart aura with the others in order to enhance their capabilities without the need for hours of reprogramming. Cobots (i.e. where humans and robots work side by side for maximum effectiveness) may also leverage smart auras to help achieve flexibility in how robots are used in the manufacturing industry. In embodiments, an aura may be interchangeable between humans and devices.

As an example, the replacement of a fixed set of production lines that can be configured dynamically for performing a set of activities by using this smart aura configuration is desirable. For example, consider a confectionary (baking) production line. The same machinery may be used for preparing various products (e.g. cookies, bread). However, the configurations of each of the machines will need to be different e.g. between cookies and bread. The temperature setting and timing for an oven are very different between those two products. Similarly, the speed of a mixer varies, and even the conveyor belt may have different speeds depending on the task being accomplished. Accordingly, a smart aura may be used to reconfigure each machine's configurations so that the end goals are met. This enables the flow of products and components seamlessly between different workstations and allows manufacturing and production sequences with entirely different process steps to be completed in a fully automated fashion.

Figure 2:
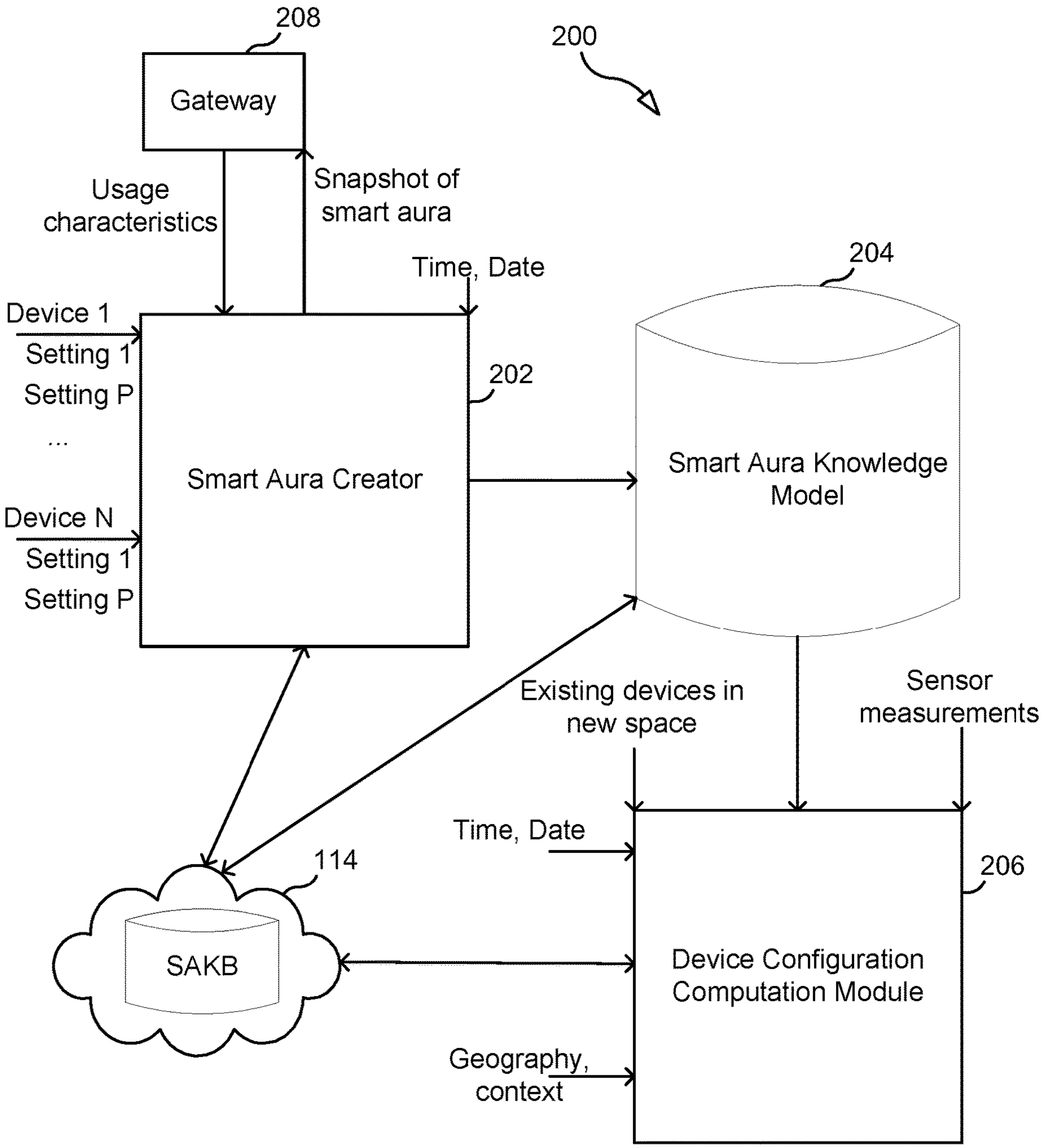
FIG. 2 shows a system according to an embodiment.

FIG. 2 illustrates a system according to an embodiment. As shown, system 200 includes one or more components, such as a smart aura creator (SAC) 202, a smart aura knowledge model (SAKM) 204, a device-discovery-and-configuration module (DDCM) 206, and a smart aura knowledge base (SAKB) 114. System 200 may also include a gateway 208. Exemplary inputs and outputs and exemplary communication pathways are shown for system 200. In embodiments, the components of system 200 may have more or fewer inputs and outputs, and may generally communicate with any other component in any way. Additionally system 200 may have more or fewer components as shown. In embodiments, the components of system 200 may be virtual servers housed in a single server or may be spread out among multiple servers, whether co-located or located in geographically disparate locations.

SAC 202 may be used to create a smart aura. As illustrated, SAC 202 may communicate with the gateway 208. For instance, SAC 202 may fetch device characteristics from gateway 208 (or elsewhere). Such device characteristics may include usage characteristics of the devices, as well as configuration parameters for each device. Devices 1 through N are illustrated in FIG. 1 as having settings 1 through P. This is for illustrative purposes. Consistent with embodiments described herein, there may be any number of devices, and the devices may each have any number of settings. SAC 202 may also receive information about device interactions, as well as time and date information or other information regarding geography, context, and seasonality. These device characteristics may be located on the gateway, or may be distributed across various nodes, and therefore SAC 202 and/or gateway 208 may need to communicate with various nodes to retrieve this data. Some or all of this data, or information on how to retrieve such data, may also exist directly on the primary identifying device. Upon creation, data describing the smart aura is sent to SAKM 204 and/or SAKB 114.

Figure 3:
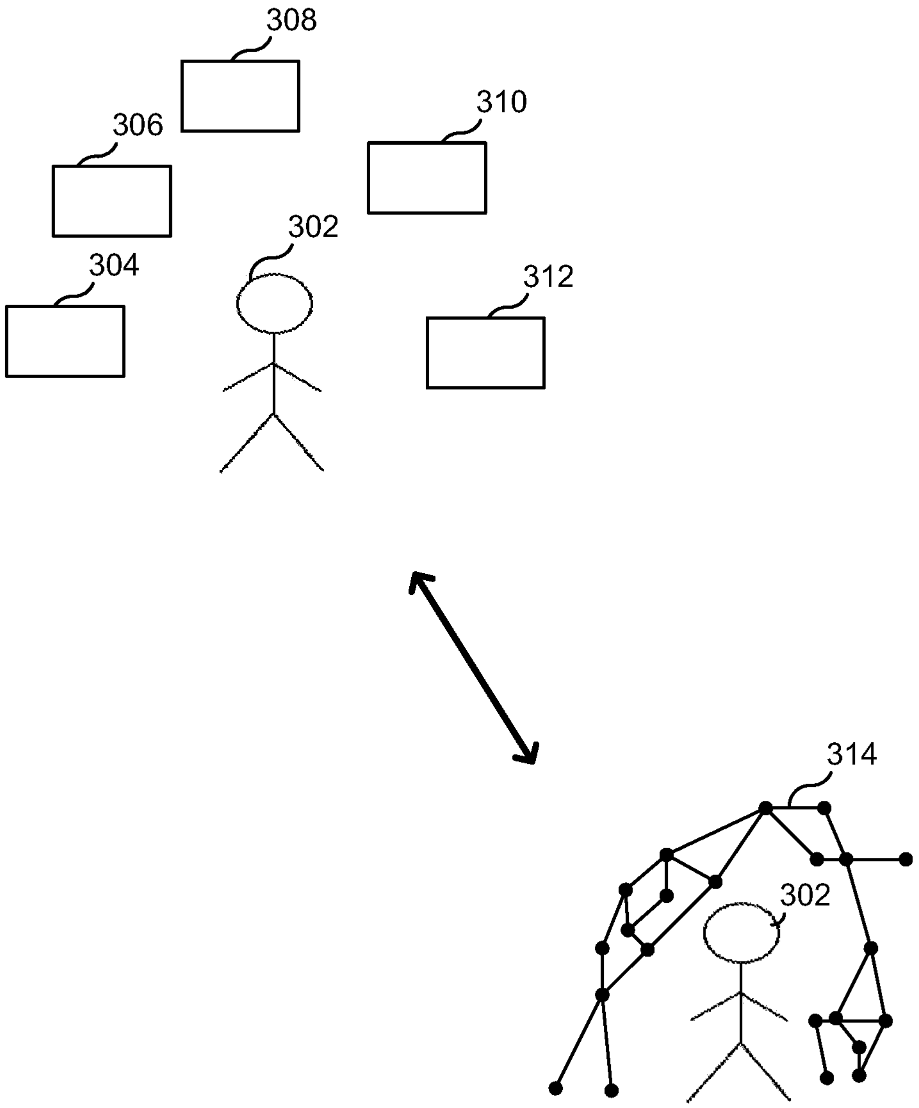
FIG. 3 shows smart aura creation and translation according to an embodiment.

FIG. 3 illustrates a smart aura according to an embodiment. FIG. 3 shows a user 302 (here depicted as a human user) surrounded by IoT devices 304-312 in a given environment. Such devices 304-312 may include, by way of example, a coffee machine, a lamp, a heating or cooling unit, a lightbulb, and a television, or any other type of smart device. SAC 202 may create a smart aura 314, which includes information identifying devices 304-312 along with their corresponding configurations and other information such as how the devices interact with each other.

Referring back to FIG. 2, SAKM 204 may store the smart aura. One aspect of the smart aura is the ability to automatically discover and configure the environment based on the user's preferences that are encoded in the smart aura. To do this, in some embodiments, a smart aura may represent the devices in the environment and their capabilities by using a smart object, such as an Internet Protocol for Smart Object (IPSO) Smart Object or the Web of Things (WoT) thing description. IPSO Smart Objects, for instance, provide a common design pattern, i.e. an object model, to provide high-level interoperability between Smart Object devices and connected software applications on other devices and services. Likewise, a "Thing" (with reference to the Web of Things) is an abstraction of a physical or virtual entity that provides interactions to and participates in the Web of Things.

Figure 4:
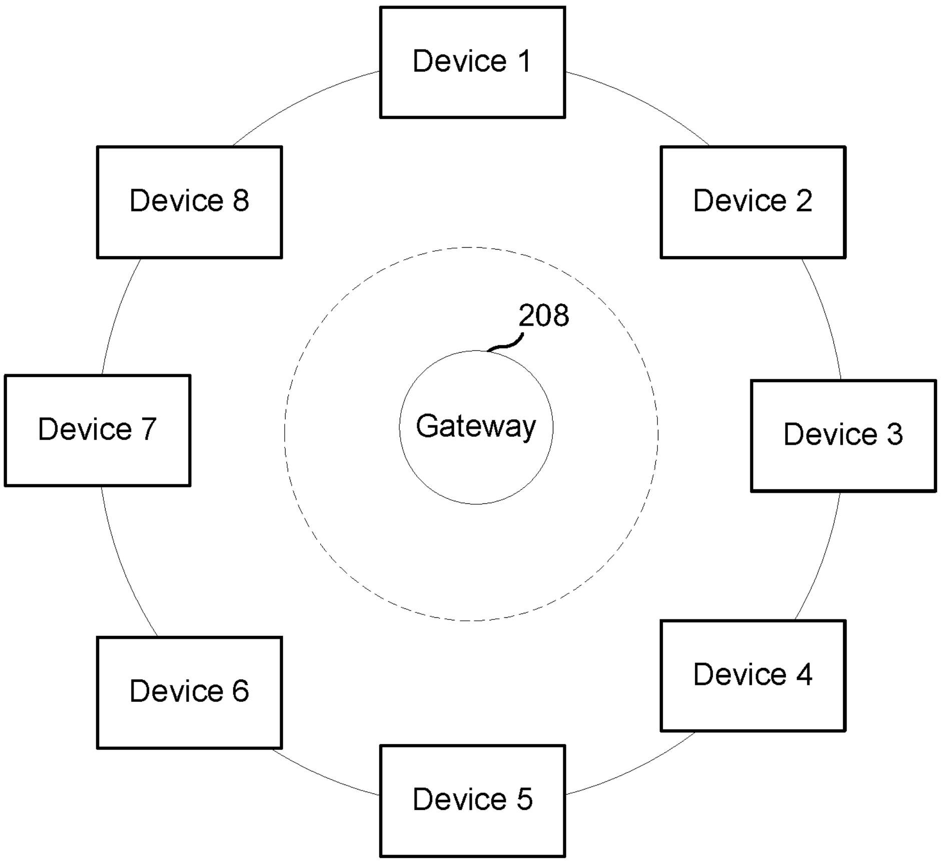
FIG. 4 shows example device characteristics according to an embodiment.

FIG. 4 illustrates a smart object, according to an embodiment. FIG. 4 shows a number of devices (labeled as "Device 1" through "Device 8") that each communicate with a common gateway 208. Each device may have a specific task (e.g. make coffee, control lights). Each device may interact with each other device, as shown in the "Device Interactions" chart. A given row i and column j in the chart indicates that device i has interacted with device j. As shown here, interactions are not necessarily symmetrical. For instance, the entry for (D3, D4) shows that D3 has interacted with D4 three times, while the entry for (D4, D3) shows that D4 has interacted with D3 only once. What is considered an interaction, and the nature of such interactions, may vary by device, or by how the smart objects are modeled. For example, a smart watch, a tablet, and a smart phone may each interact with each other in various ways (e.g. retrieve email or song information), while another device such as a smart coffee maker may not interact with other devices, or may have a more narrow range of interactions. The table is shown for illustrative purposes, and one or more different types of interactions may also be modeled.

Models for smart objects may provide interfaces that are required to interact with the device (e.g. to read from, write to, or actuate the device). SAKM 204 may use such models to facilitate device interaction, or may in some embodiments be directly responsible for device interaction. Gateway 208 may maintain an interaction database, where it captures the interactions between various devices (e.g. all interactions, or interactions related to a specific task). This information may be used to identify the device types that are part of the smart aura.

A smart aura may include a knowledge model containing some or all devices used by the user, the geographies associated with those devices, their corresponding interactions, and the configurations associated with those devices. The knowledge model may also include task-specific information, such as interactions and configurations necessary to accomplish a particular task (e.g. reach a specific temperature or luminosity level). As part of this model, each device may include a "device fingerprint" or feature vector. For example, such a feature vector may include the device type (e.g. hierarchical classification), a range of the device, a TCP window, device interconnectivity information, and so on. As an example, a device having device id 2 may have a feature vector that includes:

$$\begin{bmatrix} \text{"Temperature sensor"} \\ 2\text{ m} \\ .1\text{ s} \\ <8>, <34>, <12> \\ \vdots \end{bmatrix}$$

This feature vector indicates that the device having device id 2 is a temperature sensor, that it has an effective range of 2 m (which in the context of the temperature sensor indicates that the sensor may accurately detect temperature up to 2 m from the sensor), that it has a TCP window of 0.1 s, and that the device may communicate with device ids 8, 34, and 12. The feature vector may also include additional information not shown here.

Referring back to FIG. 2, DDCM 206 may determine the relevant devices to discover and pair with, and may perform the automatic configuration of those devices. As shown in FIG. 2, DDCM 206 may include a number of inputs. For instance, DDCM 206 may receive model information from SAKM 204, and may receive information from various devices including the relevant devices to be automatically configured. As examples of such information from devices, DDCM 206 may receive sensor measurements (e.g., from a temperature sensor). Additionally, DDCM 206 may receive time and date information or other information regarding geography, context, and seasonality. DDCM 206 may output device characteristics and configurations and device actuations. For example, DDCM 206 may determine specific settings for each of the devices to be automatically configured. Additionally, DDCM 206 may also cause such devices to perform certain actions, such as by triggering device actuations.

In an embodiment, DDCM 206 may include an anomaly detection module configured to detect an anomalous configuration. Such a module may be used, for example, to correct or otherwise modify configuration parameters that are detected to be improper for any reasons, or unlikely to achieve the intended goal. For instance, if a setting is arrived at that would cause the air conditioner to turn on and cool the room when the in-door temperature is low and it is winter, the anomaly detection module may be used to modify the settings, or to cause a trigger to alert the user about the anomaly to determine that the setting is acceptable.

Translating the configurations in the smart aura to automatically discover and configure relevant devices is illustrated by FIG. 3. As described above, FIG. 3 can show how SAC 202 creates a smart aura 314 for user 302 from devices 304-312. Similarly, FIG. 3 can show how DDCM 206 may apply a smart aura 314 to a set of new devices 304-312 in a new environment.

Two different approaches to translation are described.

First, what is referred to here as a direct one-to-one mapping may be used. This refers to a matching of one device with another, e.g. by using ontologies or some other type of classification of devices. In this embodiment, a first device in the smart aura is matched with a second device, e.g. based on a similarity of device types (e.g. "coffee maker 1" is matched with "coffee maker 2"). For each device in the smart aura, devices in the new environment may be ranked from most similar to least similar. For example, a smart TV may be ranked as having some similarity to a smart mp3 player in the new environment (e.g. both could play music and be compatible with streaming music from a user's primary identifying device), but the smart TV may be ranked as having a greater similarity to a different smart TV in the new environment. This ranking may enable devices from different manufacturers or having similar capabilities to receive relevant configuration information from the smart aura and, for example, to work in a similar way to what the user is familiar with and prefers. Once a match is made between two or more devices, some translation may be performed. That is, while in some embodiments a configuration from the smart aura may be directly applicable to a new device, in other embodiments the configuration may need to be translated to account for e.g. changes across different manufacturers. Appropriate methods of translation may be used here, and it is possible that the smart aura may learn from past experience and/or receive translation suggestions from one or more SAKM 204 or SAKB 114 or other node. In embodiments, device similarity (as used for ranking devices from most similar to least similar) can be calculated from e.g. data usage, device type, performance characteristics, capabilities (e.g. heat a room, turn on a light), inputs and outputs, and effect of the capabilities (e.g. adjust temperature or luminance).

Second, what is referred to here as goal-driven reasoning may be used. In embodiments, the configurations within the smart aura can be considered as goals and in turn the capabilities of the devices may constitute an action space. From this, planning techniques may be used to arrive at a plan to reach the configuration in an optimal way. For example, a luminosity level of L can be reached by turning on a single bulb in the user's home. In another larger space, this could be achieved by opening the blinds and turning on two bulbs. Such goal-driven reasoning may be done in a number of ways, including e.g. in a deterministic way using classical AI planning, or using reinforcement learning methods such as Q-learning.

Figure 5:
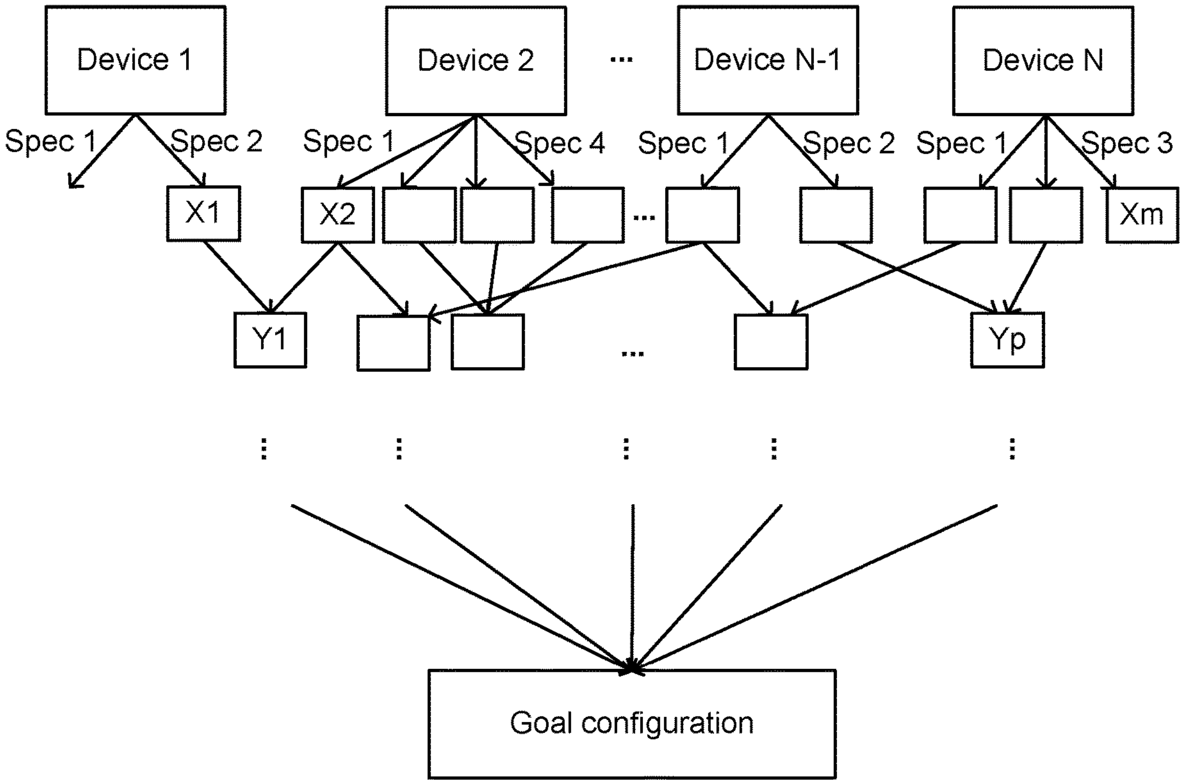
FIG. 5 shows an example goal-driven search according to an embodiment.

FIG. 5 shows an example of classical planning to achieve a goal configuration. Each device's configurations can be considered as an action with various parameters. This constitutes a large search space, where various combinations of configurations of all devices could exist. One particular combination of these configurations corresponds to the goal. As shown in FIG. 5, for example, a given configuration (e.g., Spec 2 for Device 1) will lead to a given state (e.g., state X1). By searching through the space of all configurations, eventually a set of configurations for the devices may be found that achieves the desired outcome. This is referred to as the goal configuration in FIG. 5. Using classical planning, for example, such a search can be carried out according to an optimization function, such as minimizing cost or time. Alternatively, reinforcement learning or another technique for selecting a set of configurations can be used.

Referring back to FIGS. 1 and 2, SAKB 114 may be used to store smart auras. In some embodiments, some or all smart auras may be collected, e.g. for a specific region or across all regions. Because each smart aura is continuously being updated (e.g. based on local learning, new devices or configurations), each smart aura is refining its individual model. SAKB 114 may also store a global model (or a region-specific model or other aggregated model over a subset of smart auras available to SAKB 114). This global model may be created using federated learning. One benefit of using federated learning, for instance, is that privacy is preserved. In this example, SAKB 114 may send the global model out to users (e.g. to a primary identifying device containing a user's smart aura) for a given time instance, and the various users may in turn send a difference back to SAKB 114 e.g. representing a difference between the global model at the given time instance and the respective user's smart aura. In this way, the individual smart aura may be updated based on the global model and/or the global model may be updated based on the aggregate of individual smart auras.

The global model is useful in various ways. For example, in one embodiments, an initial smart aura for a completely new environment such as a new factory or home may be created from the global model. In such a case, a feature vector of all devices can be uploaded to the cloud, and an instantiated model can be fetched from the SAKB 114.

Figure 6:
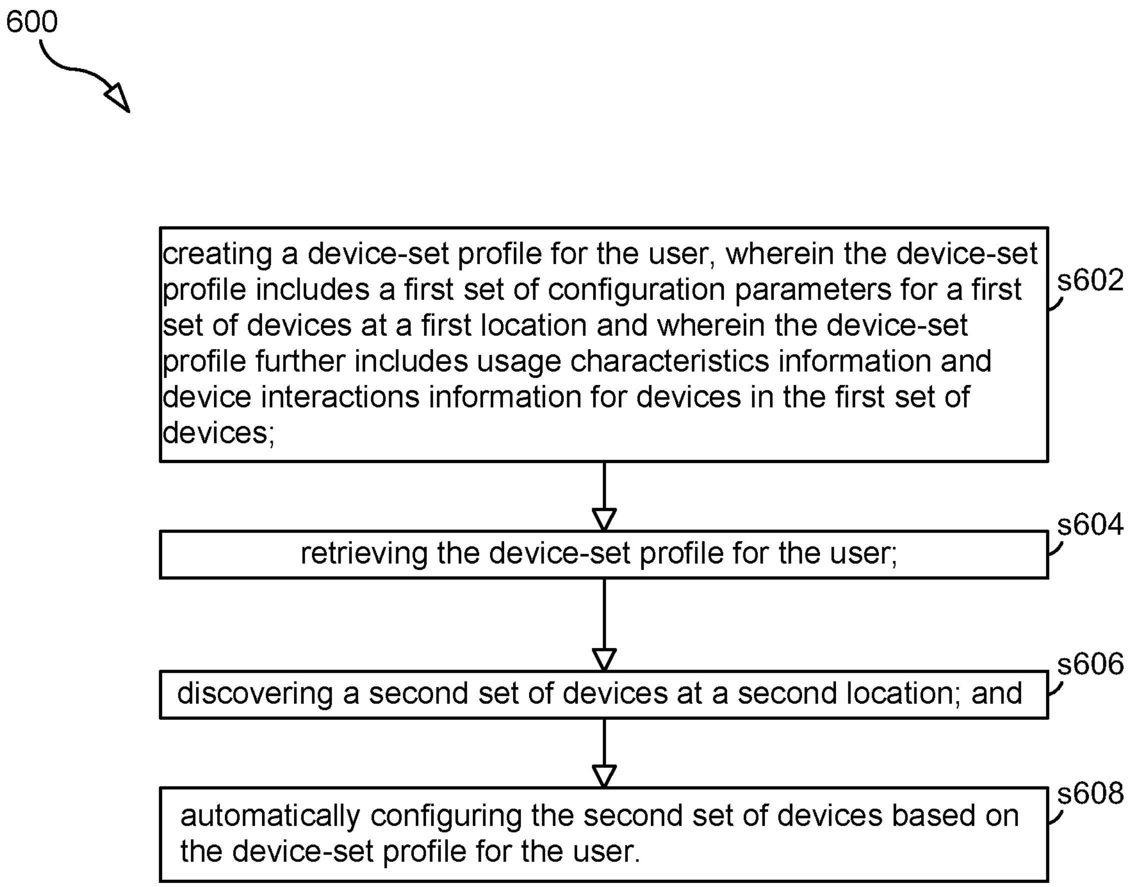
FIG. 6 is a flow chart illustrating a process according to some embodiments.

FIG. 6 is a flowchart illustrating a process 600 according to some embodiments. Process 600 may begin with step s602.

Step s602 comprises creating a device-set profile for the user, wherein the device-set profile includes a first set of configuration parameters for a first set of devices at a first location and wherein the device-set profile further includes usage characteristics information and device interactions information for devices in the first set of devices.

Step s604 comprises retrieving the device-set profile for the user.

Step s606 comprises discovering a second set of devices at a second location.

Step s608 comprises automatically configuring the second set of devices based on the device-set profile for the user.

In some embodiments, the user includes a human or a robot. In some embodiments, step s606 (discovering the second set of devices at the second location) further comprises: determining the user is at the second location for a period of time greater than a threshold, wherein the second location is different from the first location; and determining which devices at the second location are relevant to the user based on the device-set profile.

In some embodiments, step s608 (automatically configuring the second set of devices based on the device-set profile for the user) further comprises: determining a goal specification for the second set of devices based on the device-set profile; searching a search space comprising combinations of configurations for the second set of devices; and as a result of searching, determining configurations for the second set of devices based on the goal specification. In some embodiments, determining configurations for the second set of devices based on the goal specification comprising minimizing a cost function, wherein the cost function is based on the goal specification.

In some embodiments, step 608 (automatically configuring the second set of devices based on the device-set profile for the user) further comprises: determining a correspondence between a first device in the first set of devices and a second device in the second set of devices; determining a first configuration from the device-set profile corresponding to the first device; and translating the first configuration into a second configuration for the second device, wherein the second configuration is compatible with the second device.

In some embodiments, the method further includes updating the device-set profile for the user, wherein updating the device-set profile for the user comprises adding additional configuration parameters for one or more devices. In some embodiments, the method further includes detecting a new device at the first location and wherein updating the device-set profile for the user is performed in response to detecting the new device at the first location. In some embodiments, the method further includes detecting a second set of devices at a second location; and receiving a second set of configuration parameters for the second set of devices at the second location, wherein updating the device-set profile for the user is performed in response to receiving the second set of configuration parameters.

In some embodiments, step 602 (creating the device-set profile for the user) further comprises receiving a master device-set profile from a database and in embodiments the master device-set profile is based on input received from multiple users. In some embodiments, the method further includes updating the master device-set profile for a given time instant; creating a profile difference between the device-set profile for the user and the master device-set profile; and sending the profile difference to the database. In some embodiments, the method further includes updating the master device-set profile for a given time instant; creating a profile difference between the device-set profile for the user and the master device-set profile; and updating the device-set profile based on the profile difference.

Figure 7:
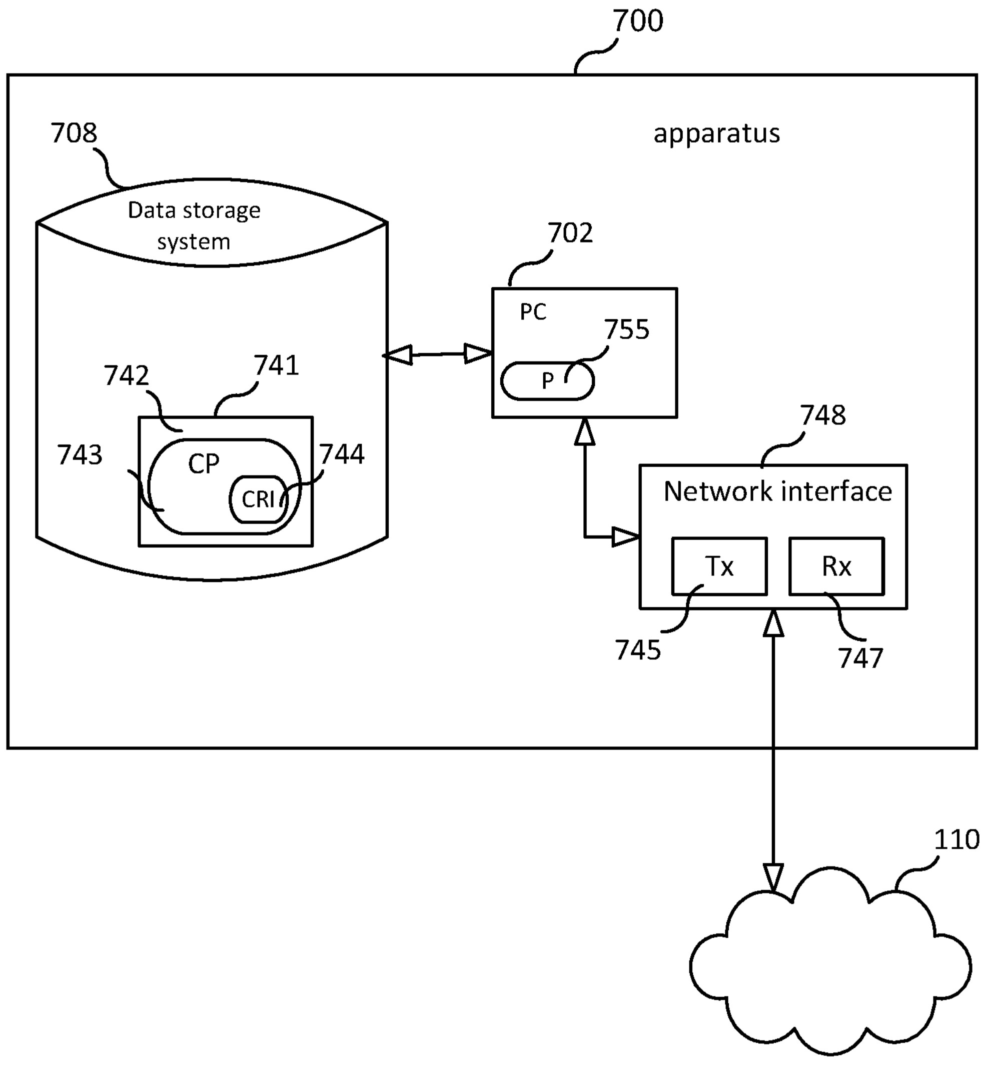
FIG. 7 is a block diagram illustrating an apparatus, according to an embodiment, for performing steps disclosed herein.

FIG. 7 is a block diagram of an apparatus 700, according to some embodiments. Apparatus 700 may be a network node, a primary identifying device, or other computer, and may also include one or more of SAKB 114, SAC 202, SAKM 204, DCCM 206, and gateway 208. As shown in FIG. 7, apparatus 700 may comprise: processing circuitry (PC) 702, which may include one or more processors (P) 755 (e.g., a general purpose microprocessor and/or one or more other processors, such as an application specific integrated circuit (ASIC), field-programmable gate arrays (FPGAs), and the like), which processors 755 may be co-located in a single housing or in a single data center or may be geographically distributed (i.e., apparatus 700 may be a distributed apparatus); a network interface 748 comprising a transmitter (Tx) 745 and a receiver (Rx) 747 for enabling apparatus 700 to transmit data to and receive data from other nodes connected to network 110 (e.g., an Internet Protocol (IP) network) to which network interface 748 is connected; and a local storage unit (a.k.a., "data storage system") 708, which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 743 is configured such that when executed by PC 702, the CRI causes apparatus 700 to perform steps described herein (e.g., steps described herein with reference to the flow charts). In other embodiments, NF apparatus 600 may be configured to perform steps described herein without the need for code. That is, for example, PC 702 may consist merely of one or more ASICs. Hence, the features of the embodiments described herein may be implemented in hardware and/or software.

Figure 8:
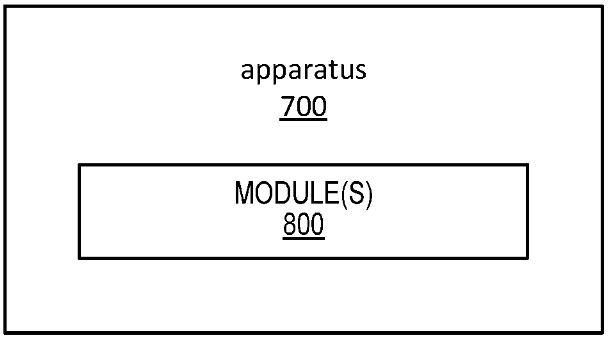
FIG. 8 is a block diagram illustrating an apparatus, according to an embodiment, for performing steps disclosed herein.

FIG. 8 is a schematic block diagram of the apparatus 700 according to some other embodiments. The apparatus 700 includes one or more modules 800, each of which is implemented in software. The module(s) 800 provide the functionality of apparatus 700 described herein and, in particular, the functionality of one or more of SAKB 114, SAC 202, SAKM 204, DCCM 206, and gateway 208 (e.g., the steps herein, e.g., with respect to FIG. 1 and/or FIG. 6).

While various embodiments are described herein (including the attached appendices which contain proposals to modify a 3GPP standard), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for configuring devices for a user, the method comprising:

creating a device-set profile for the user, wherein the device-set profile includes a first set of configuration parameters for a first set of devices at a first location and wherein the device-set profile further includes usage characteristics information and device interactions information for devices in the first set of devices, wherein the device interactions information for devices in the first set of devices comprises information about how devices in the first set of devices interact with each other;

retrieving the device-set profile for the user;

identifying one or more device types that are part of the device-set profile for the user based at least in part on the device interactions information for the devices in the first set of devices;

discovering a second set of devices at a second location; and automatically configuring the second set of devices based on the device-set profile for the user.

2. The method of claim 1, wherein the user includes one of a human and a robot.

3. The method of claim 1, wherein discovering the second set of devices at the second location comprises:

determining the user is at the second location for a period of time greater than a threshold, wherein the second location is different from the first location; and determining which devices at the second location are relevant to the user based on the device-set profile.

4. The method of claim 1, wherein automatically configuring the second set of devices based on the device-set profile for the user comprises:

determining a goal specification for the second set of devices based on the device-set profile;

searching a search space comprising combinations of configurations for the second set of devices; and as a result of searching, determining configurations for the second set of devices based on the goal specification.

5. The method of claim 4, wherein determining configurations for the second set of devices based on the goal specification comprising minimizing a cost function, wherein the cost function is based on the goal specification.

6. The method of claim 1, wherein automatically configuring the second set of devices based on the device-set profile for the user comprises:

determining a correspondence between a first device in the first set of devices and a second device in the second set of devices;

determining a first configuration from the device-set profile corresponding to the first device; and translating the first configuration into a second configuration for the second device, wherein the second configuration is compatible with the second device.

7. The method of claim 1, further comprising:

updating the device-set profile for the user, wherein updating the device-set profile for the user comprises adding additional configuration parameters for one or more devices;

detecting a second set of devices at a second location; and receiving a second set of configuration parameters for the second set of devices at the second location, wherein updating the device-set profile for the user is performed in response to receiving the second set of configuration parameters.

8. The method of claim 1, wherein creating the device-set profile for the user comprises receiving a master device-set profile from a database, the method further comprising:

updating the master device-set profile for a given time instant;

creating a profile difference between the device-set profile for the user and the master device-set profile; and updating the device-set profile based on the profile difference.

9. A node adapted for configuring devices for a user, the node comprising:

a data storage system; and a data processing apparatus comprising a processor, wherein the data processing apparatus is coupled to the data storage system, and the data processing apparatus is configured to:

create a device-set profile for the user, wherein the device-set profile includes a first set of configuration parameters for a first set of devices at a first location and wherein the device-set profile further includes usage characteristics information and device interactions information for devices in the first set of devices, wherein the device interactions information for devices in the first set of devices comprises information about how devices in the first set of devices interact with each other;

retrieve the device-set profile for the user;

identify one or more device types that are part of the device-set profile for the user based at least in part on the device interactions information for the devices in the first set of devices;

discover a second set of devices at a second location; and automatically configure the second set of devices based on the device-set profile for the user.

10. The node of claim 9, wherein the user includes one of a human and a robot.

11. The node of claim 9, wherein discovering the second set of devices at the second location comprises:

determining the user is at the second location for a period of time greater than a threshold, wherein the second location is different from the first location; and determining which devices at the second location are relevant to the user based on the device-set profile.

12. The node of claim 9, wherein automatically configuring the second set of devices based on the device-set profile for the user comprises:

determining a goal specification for the second set of devices based on the device-set profile;

searching a search space comprising combinations of configurations for the second set of devices; and as a result of searching, determining configurations for the second set of devices based on the goal specification.

13. The node of claim 12, wherein determining configurations for the second set of devices based on the goal specification comprising minimizing a cost function, wherein the cost function is based on the goal specification.

14. The node of claim 9, wherein automatically configuring the second set of devices based on the device-set profile for the user comprises:

determining a correspondence between a first device in the first set of devices and a second device in the second set of devices;

determining a first configuration from the device-set profile corresponding to the first device; and translating the first configuration into a second configuration for the second device, wherein the second configuration is compatible with the second device.

15. The node of claim 9, wherein the data processing apparatus is further configured to:

update the device-set profile for the user, wherein updating the device-set profile for the user comprises adding additional configuration parameters for one or more devices.

16. The node of claim 15, wherein the data processing apparatus is further configured to detect a new device at the first location and wherein updating the device-set profile for the user is performed in response to detecting the new device at the first location.

17. The node of claim 15, wherein the data processing apparatus is further configured to:

detect a second set of devices at a second location; and receive a second set of configuration parameters for the second set of devices at the second location, wherein updating the device-set profile for the user is performed in response to receiving the second set of configuration parameters.

18. The node of claim 9, wherein creating the device-set profile for the user comprises receiving a master device-set profile from a database.

19. The node of claim 18, wherein the master device-set profile is based on input received from multiple users.

20. The node of claim 18, wherein the data processing apparatus is further configured to:

update the master device-set profile for a given time instant;

create a profile difference between the device-set profile for the user and the master device-set profile; and send the profile difference to the database.

21. The node of claim 18, wherein the data processing apparatus is further configured to:

update the master device-set profile for a given time instant;

create a profile difference between the device-set profile for the user and the master device-set profile; and update the device-set profile based on the profile difference.

* * * * *